United States Patent
Murray

Patent Number: 6,153,289
Date of Patent: Nov. 28, 2000

[54] LAMINATES

[76] Inventor: Nicholas J. Murray, 12 Appleton Court, Bishopthorpe, York, YO2 1RY, United Kingdom

[21] Appl. No.: 08/969,716

[22] Filed: Sep. 30, 1997

Related U.S. Application Data

[62] Continuation-in-part of application No. 08/714,506, Sep. 16, 1996, abandoned, which is a continuation of application No. 08/325,388, filed as application No. PCT/GB93/00883, Apr. 28, 1993, abandoned.

[30] Foreign Application Priority Data

Apr. 29, 1992 [GB] United Kingdom ............ 9209216
Jul. 23, 1992 [GB] United Kingdom ............ 9215672

[51] Int. Cl.[7] .................. B32B 3/00; B32B 27/08; B32B 27/30; B32B 27/36

[52] U.S. Cl. .................. 428/201; 428/195; 428/203; 428/204; 428/206; 428/207; 428/214; 428/215; 428/216; 428/336; 428/337; 428/412; 428/480; 428/483; 428/520; 428/522; 428/523; 156/277; 156/281; 156/297; 156/299; 156/300; 156/324.4; 156/332; 427/466; 427/147

[58] Field of Search .................. 428/195, 199, 428/200, 201, 202, 203, 204, 206, 207, 480, 483, 520, 522, 523, 214, 215, 216, 334, 335, 336, 337, 339, 412; 156/277, 281, 297, 299, 300, 324.4, 332; 427/466, 147

[56] References Cited

U.S. PATENT DOCUMENTS

| | | |
|---|---|---|
| 3,924,019 | 12/1975 | Jacob ............ 427/14 |
| 4,048,736 | 9/1977 | Castleman et al. . |
| 4,234,644 | 11/1980 | Blake et al. ............ 428/204 |
| 4,378,392 | 3/1983 | Segel . |
| 4,387,129 | 6/1983 | Vincent . |
| 4,519,155 | 5/1985 | Gallagher et al. . |
| 4,663,874 | 5/1987 | Sano et al. . |
| 4,977,136 | 12/1990 | Fujiwara et al. . |
| 5,087,495 | 2/1992 | Nelson ............ 428/46 |
| 5,126,797 | 6/1992 | Forest et al. . |
| 5,171,625 | 12/1992 | Newton . |
| 5,681,660 | 10/1997 | Bull et al. ............ 428/500 |
| 5,736,228 | 4/1998 | Morris et al. ............ 428/195 |

FOREIGN PATENT DOCUMENTS

| | | |
|---|---|---|
| EP159 854 | 10/1985 | European Pat. Off. . |
| EP 0195 234 | 9/1986 | European Pat. Off. . |
| 0 424 131 A1 | 4/1991 | European Pat. Off. . |
| EP 479 295 | 4/1992 | European Pat. Off. . |
| GB 2 119 310 | 11/1983 | United Kingdom . |
| WO 90/12694 | 11/1990 | WIPO . |

*Primary Examiner*—Vivian Chen
*Attorney, Agent, or Firm*—Oliff & Berridge, PLC

[57] ABSTRACT

A laminate comprises:
  a first layer of thickness between 75 $\mu$m and 150 $\mu$m of a polyester material not being absorbent of xerographic toner and having an image deposited on a first surface thereof by an electrostatic deposition process,
  a second layer of optically transparent or translucent plastics material,
  a first surface of the first layer being bonded to the second layer by a layer of optically transparent adhesive material, in a lamination process involving heat and pressure to ensure that the relief of the deposited image is apparent in the laminate through the second layer,
  the arrangement being such that the image on the first layer can be viewed through the second layer and the layer of optically transparent adhesive material.

27 Claims, 1 Drawing Sheet

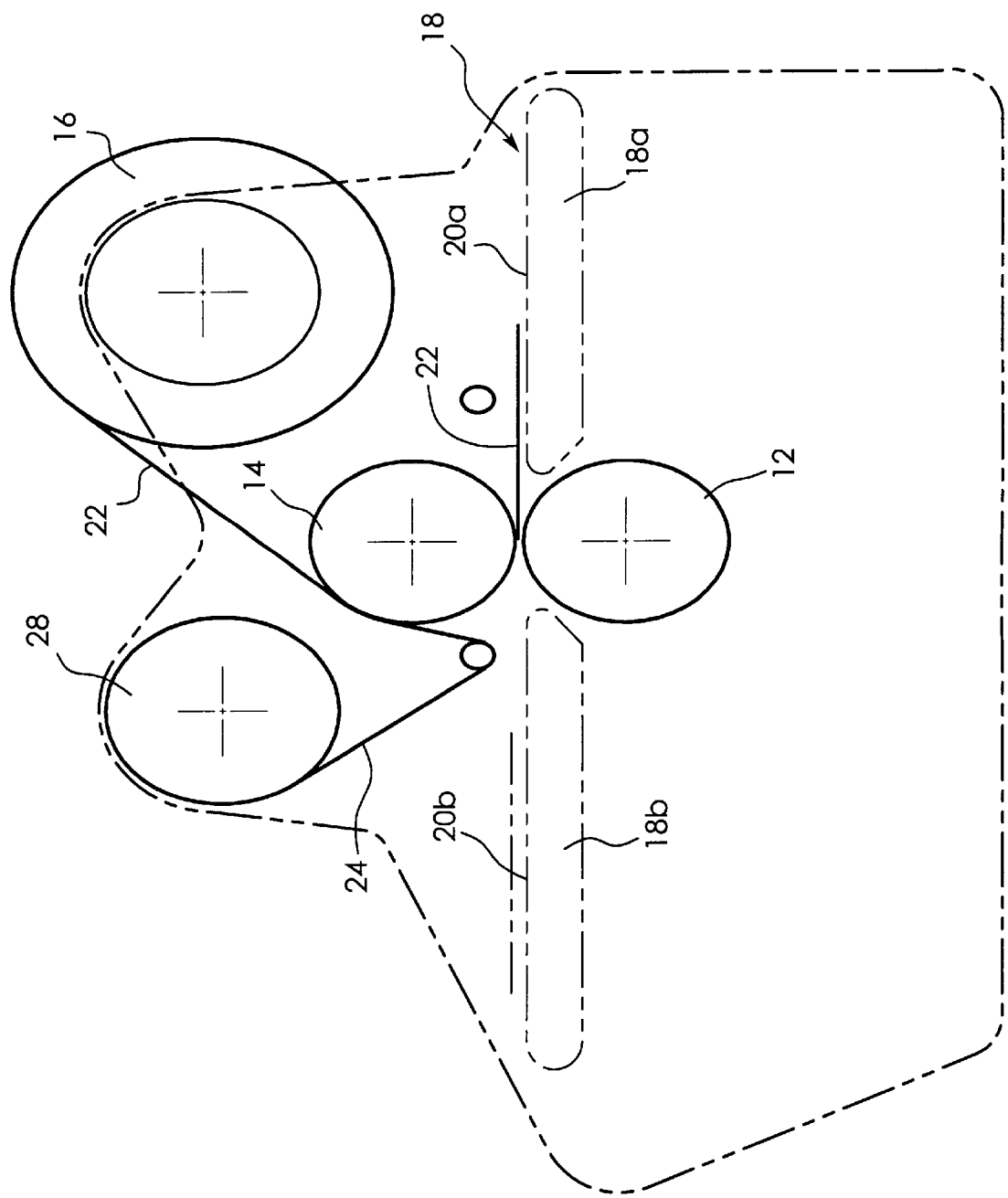

LAMINATES

This is a Continuation-in-Part of Application Ser. No. 08/714,506, filed Sep. 16, 1996, abandoned, which in turn is a continuation application of U.S. application Ser. No. 08/325,388, filed Oct. 27, 1994, abandoned, which in turn is a U.S. National Stage application of PCT Serial No. PCT/GB93/00883, filed Apr. 28, 1993.

FIELD OF THE INVENTION

This invention relates to laminates, and more particularly laminates for use in the production of display systems and a process for the production of such laminates.

BACKGROUND OF THE INVENTION

Display systems of the type used, for example, in signs and placards, posters, pictures, stickers, illuminated and reflective signs, are produced by a wide variety of techniques. A typical display system comprises a laminate of an optically transparent protective cover surface and a sheet of paper carrying the required information printed thereon. In general the printing process is expensive, particularly where colour printing is required, and for outdoor applications the paper must be protected against ingress of water.

It is known to laminate the printed paper sheet to the optically transparent cover surface using an optically transparent adhesive, and if necessary to apply a protective backing surface which may also be adhered to the paper.

Such laminates are widely used for advertising and display purposes, but because of the printing process are relatively expensive, particularly when only small numbers of prints are required.

Attempts have been made to produce laminates for advertising and display purposes by the use of heat transfer processes, but these are also relatively expensive and of limited application. Photographic processes have also been used, but only to a limited extent again because of the high costs involved EP-A-0424131 discloses a process for the electrophotographic deposition of an image on a strippable resin layer formed on a carrier sheet, and subsequent lamination of the stripped, imaged layer with a protective plastics layer. However, the process employed is for the production of large scale vehicle signs and is not concerned with the quality of the final image.

There is therefore a need for a laminate comprising a protective optically transparent cover surface and a sheet carrying information to be displayed, which is both versatile and can be inexpensively produced in small or large quantities on relatively inexpensive equipment. More importantly, there is a need for high quality imaging which is still inexpensive but which produces images which are long-lasting, weather-resistant and of museum-quality, that is to say, an accurate an photographic-type reproduction of the original.

BRIEF DESCRIPTION OF THE INVENTION

In the present invention there is provided a laminate, suitable for use as a display system, which comprises a polyester material having an image electrostatically deposited thereon, and a process for the production of such a laminate which results in the texture of the image being apparent in the finished article and thereby enhancing its visual appeal.

According to one aspect of the present invention there is provided a laminate comprising:

- a first layer of thickness between 75 $\mu$m and 150 $\mu$m of a polyester material not being absorbent of xerographic toner and having an image deposited on a first surface thereof by an electrostatic deposition process,
- a second layer of optically transparent or translucent plastics material,
- a first surface of the first layer being bonded to the second layer by a layer of optically transparent adhesive material so that the relief of the deposited image is apparent in the laminate through the second layer,
- the arrangement being such that the image on the first layer can be viewed through the second layer and the layer of optically transparent adhesive material.

In a second aspect the invention further provides a method of making a laminate which comprises:

- depositing an image on a first surface of a first layer of thickness between 75 $\mu$m and 150 $\mu$m of a polyester material not being absorbent of xerographic toner by an electrostatic deposition process, and
- bonding a second layer of optically transparent or translucent material to the first surface of the first layer using an optically transparent adhesive material in a lamination process involving heat and pressure to ensure that the relief of the deposited image is apparent in the laminate through the second layer and such that the image on the first layer can be viewed through the second layer and the optically transparent adhesive material.

By producing a picture in this way, a durable, weatherable long-lasting photo-realistic image can be constructed in an inexpensive and rapid process. This is achieved by the combination of electrostatic deposition of the desired image, (whether by optical copy from an original, or digitally from a computer or from a digital camera), on a durable polyester base having thermal and dimensional stability, and overlamination with a transparent or translucent plastics layer which conforms to the surface relief of the deposited image so that, not only is the deposited image protected from weather and abrasion, but also the appearance of the finished article is markedly enhanced by the dimensional depth given to it by the relief of the deposited image.

In order to ensure efficient adhesion between the layers, adhesion inhibiting materials associated with the electrostatic deposition process are removed from the first layer whilst leaving the image undisturbed.

BRIEF DESCRIPTION OF THE DRAWING

The FIGURE shows a laminator suitable for use with the laminates of the present invention.

DETAILED DESCRIPTION OF THE INVENTION

The first layer of polymeric film material preferably comprises a polyacrylate, and more particularly a polyethylene terephthalate. A preferred polyethylene terephthalate is produced by ICI under the trade mark Melinex, of which the particular grades preferred for use in the present invention are Melinex 542 and Melinex 054. These grades are pre-treated to improve the adhesion thereto by print and lacquer. Melinex S is also suitable, but this is an untreated grade which may need to be treated to improve its image adhesion characteristics.

The treatment may, for example, comprise coating with an organic polymer layer having improved image adhesion characteristics. Typical coatings which may be applied to a base film material to improve image adhesion are acrylic or cellulosic materials, which may also desirably contain a slip agent.

Preferably the polyester sheet is about 100 μm thick. Preferably, a toner receptive layer is first deposited on the polyester film comprising a dispersion of inorganic pigment in a mixture of cross-linked acrylic resins, adhesion promoters and resin modifiers. Such ingredients preferably comprise self-cross-linking carboxylated acrylic resin, polymethyl methacrylate resin, inorganic acid catalyst and Rutile Titanium Dioxide. The resins used provide adhesion to the polyester base, as well as adhesion for all types of toners used in presently available colour and monochrome photocopiers and laser printers. As the resin system is cross-linked, it provides extra rigidity to the polyester film at elevated temperatures and thereby improves feed-out characteristics. The inorganic pigment provides extra opacity and enhances the heat resistance of the polyester base film. The pigment also improves feeding characteristics of the film in photocopiers and printers by providing a rough abrasion resistant surface, ensuring consistent feeding in the machine.

Secondly, there is preferably deposited a conductive layer comprising a mixture of polymeric antistatic resins and adhesion promoters, including amorphous silica. The function of this layer is to provide the conductivity required to obtain optimum image quality in colour and monochrome photocopiers and laser printers. The resistivity of the layer is preferably in the range 1 to 10 GOhms per square. The deposited layers on the polyester layer preferably have a thickness of 15 μm, and preferably are deposited on each side of the polyester sheet. It is important that the first layer of polyester material should be thermally and dimensionally stable under the conditions used in electrostatic deposition processes. For example the temperature of an electrostatic copier roller is normally greater than 150° C., and can be from 160° C. to 190° C. Although the first layer of polyester material is exposed to the heat of the roller for only a short time, it can become degraded, twisted and buckled, or even melt, if a polymer of too low a thermal and dimensional stability is chosen. Acetate films, for example, are not normally suitable for this reason. In general, the first layer of polyester material should be capable of withstanding a temperature of at least 150° C. and preferably at least 190° C. without substantial instantaneous degradation, structural change, dimensional change, or colour change. Most preferably the film material should be such that it is thermally and dimensionally stable when exposed to a temperature of 200° C. for at least 0.5 seconds.

A polyester sheet as defined above has the thermal and dimensional stability to withstand the rigours of passage through a photocopy or laser printer machine without damage or substantial risk of jamming. Moreover, coating both sides of the sheet ensures that the sheet remains flat after printing/copying. The above preferred grades of film are normally transparent, but for many purposes an opaque, and especially a white opaque, film is preferred. Such white opaque films can be produced by applying to the polyester a coating layer comprising a filler such as silica or titanium dioxide dispersed in a suitable binder. Suitable white opaque coated polyester sheets are produced by Imperial Graphic Products plc, Folex, 3M and Image Data (division of ICI), although other suppliers may also have suitable products. These companies also produce films in colours other than white for example by applying to the film coating layers comprising suitable colourants. These films may also be used in the present invention.

Even where an opaque grade of polyester is used, for example because an opaque filler has been included during manufacture, the film will usually still require a surface coating for image adhesion purposes, as previously discussed.

The image is deposited on the first polyester layer by an electrostatic, and particularly a xerographic, process, preferably by passing the polyester layer through a xerographic photocopier, especially a colour photocopier. Any suitable colour photocopier can be used in the process of the present invention, for example a laser copier, or digital copier, and the invention is not limited to any particular colour photocopying method or electrostatic technique for the production of the deposited image. Good results have been achieved using a Xerox Majestik, Canon models 500, 550, 700, 800, and 1000, (including rebadged versions of these machines) Ricoh 5006, and 5206 (including rebadged versions of these machines), and Minolta CF900. These are the preferred machines, although other machines, using other electrostatic deposition techniques, may also be suitable, including most laser printers.

Xerographic processes deposit the image onto the film as a powder or toner layer which is subsequently fixed by heating and treatment with a stabilizer containing a silicone material, for example a silicone oil. (Alternatively, liquid toner inks may be employed in some copiers and printers, and these dry in air and do not require heat and treatment with a stabiliser containing silicone oil.)

However, where it is employed, the silicone-containing stabilizer remains on the surface of the xerographic electrostatically deposited image and inhibits adhesion to the polyester surface, such that conventional adhesives, particularly those that are active at ambient or relatively low elevated temperatures, cannot be used to form a laminate.

The silicone containing stabilizer material can be removed from the film sufficiently to obtain a substantial improvement in adhesion by gentle washing or wiping with a cleaning liquid or solution without harming the image.

In general any aqueous or non-aqueous liquid or solution capable of removing the adhesion-inhibiting materials from the film surface can be used, provided that the xerographic image is not disturbed and the film is not discoloured or degraded, but it is convenient and preferred to use an aqueous soap or detergent solution. The film carrying the deposited image can be dipped or immersed in a bath of the cleaning liquid or solution, which can, for example, comprise a detergent solution containing several drops of a commercial liquid detergent.

The adhesion-inhibiting materials can also be removed to a satisfactory extent by the application of a suitable cleaning liquid or solution which can, for example, be an aqueous or non-aqueous solution containing a detergent or some other chemical compound capable of removing oily or silicone deposits from the surface of the deposited image. The solution can, for example, be applied as a spray. Such a spray can, for example, be hand-held, and may have a hand pump trigger action. Suitable liquids and solutions are those that do not scratch or damage the surface of the image, are smear-free and stain-free, are non-toxic, and do not give off unpleasant or hazardous vapours and fumes.

The spray solution can, for example, be a solution of a detergent in a mixture of water and a suitable organic solvent, which may be, for example, an alcohol such as isopropyl alcohol, or an ether such as ethyl glycol mono butyl ether (also known as EGB). A variety of commercially available cleaning liquids and solutions can be used, but it is important that any liquid or solution should first be subjected to a trial to ensure that it does not contain any components likely to damage the image or the film.

A fine spray of the solution can be directed onto the surface of the image and the liquid then wiped away and the surface thoroughly dried using a clean, soft, lint free cloth. It is found that, with suitable treatment, which may be repeated if necessary, the deposits of adhesion-inhibiting materials may be satisfactorily removed.

It is also possible, with suitable cleaning liquids and solutions, to apply a few drops of the liquid or solution to a damp cloth and use this to wipe away the adhesion-inhibiting materials from the surface of the deposited image.

The second layer of optically transparent or translucent material comprises the protective cover surface for the image, and may comprise a biaxially orientated sheet or film of a suitable polymeric material, for example a polyester, an acrylic polymer, a polyethylene terephthalate, or a polycarbonate. The invention is not, however, limited to such materials, and other transparent or translucent sheet materials such as glass may also be used in certain applications. The sheet can be rigid or flexible depending on the application, and may be of any desired thickness. Where the second layer is translucent, that is to say not optically clear, the light transmission must still be sufficient for the image to be viewed through it, if necessary with illumination from the back of the laminate.

The optically transparent adhesive material should be capable of forming a permanent bond, and of adhering without leaving bubbles (pockets of air) in the laminate. It should of course be capable of adhering to the xerographic image comprising the toner used in the xerographic process. Suitable adhesives include acrylic-based resins such as methyl methacrylate and ethyl methacrylate, synthetic rubber-based adhesives, ethylene-propylene copolymers, propylene polymers, and ionomer resins and suitable grades are made by several manufacturers. Particularly good results have been obtained using an adhesive supplied as a film, which may have a protective overlay on one or both surfaces. Good results have been obtained using Mactac UV protective acrylic adhesive reference No. F2010, although the best results have been achieved using Hunt Europe mounting adhesives PM1 for internal uses and PM9 for outdoor uses. Rubber based adhesives are not recommended because they have a tendency to yellow and so would become visible in time.

The adhesive is preferably one that will achieve a satisfactory bonding at ambient temperatures, that is to say room temperature, or at only slightly elevated temperatures, for example below about 60° C.

Some protective cover films are supplied ready-coated with adhesive, for example Mactac, $100\mu$ vinyl polymer film with Macal 8199 acrylic adhesive, Mactac PG7036, $36\mu$ and Mactac 7075, $75\mu$, polyester polymer films with acrylic adhesive. Hunt Europe optically clear films HS50 and HS60 are particularly suitable and are precoated with heat activated adhesives. Other brands may also be suitable, although the relief effect may be lost, or not be as marked, with some thicker films suggested above. A particular advantage of heat activated adhesive is that the films can be repositioned before heat curing in order to correct any inaccuracies.

The optically transparent adhesive material is applied to the second layer of optically transparent or translucent material in a first stage, and then the adhesive coated optically transparent or translucent material is laminated to the polyester material carrying the image in the second stage. If the polyester material carrying the image is to have a backing applied thereto, this is preferably applied to the polyester material first, to avoid the possibility of the laminate curling. Lamination is achieved by passing the materials through a pair of laminating rollers. Suitable laminating rollers are produced by Hunt Europe.

In order to achieve the required photorealistic image through a photocopier or laser printed image, a particular aspect of the present invention is to employ the varying thickness of toner deposit on an image, which of course depends on the colour density of the object being copied. With suitable subjects, a relief pattern of the toner is formed on the polyester sheet and which is brought out by the subsequent lamination. This fact gives depth and texture to the final image, greatly enhancing its appearance. The relief only exists because of the non-absorption of the toner by the polyester layer and by the dimensional stability of that layer. It is only brought to its full aesthetic effect in the lamination process of the present invention.

To this end, the invention employs a lamination technique in which the first and second layers, with the adhesive between them, are passed between laminating rollers, at least one of which has a heat conductive surface at a temperature of about 80° C., and has a resilient surface. The rollers are adapted to operate at a pressure of about 750 KN per square meter on the laminate passing between the rollers. The surface speed of rotation of the rollers is about 6 mm per second, when laminating sheet material. When the first layer is already mounted on a rigid surface such as foam board, the speed can be increased to about 50 mm per second. The resilient roller conforms to the surface relief of the toner deposit on the first layer.

The laminates of the invention may be provided with a wide variety of backing surfaces, either for protection, or for adhering to a substrate, or to achieve special effects. For example, the laminate may be adhered to a substrate such as a metal, plastic, cardboard or woodblock backing sheet layer by the use of a double-sided adhesive film such as, for example, Hunt Europe double sided cold pressure adhesives PM1 and PM9. Preferably the double-sided adhesive film is provided with a protective overlay, whereby it is possible to produce self-adhesive stickers using the laminates of the present invention. Many other types of acrylic or rubber-based adhesive can of course be used for this application, and of course the adhesive may be applied as a coating from a solvent based system, or by any other convenient means. In some cases it is possible to obtain the backing sheet with the adhesive already adhered thereto and ready for use once its protective overlay is removed. In such cases a preferred lamination method comprises first depositing the image on a first surface of the film, then laminating a second surface of the film to the backing sheet, removing the adhesion inhibiting materials from the film surface, and finally laminating the second layer of optically transparent of translucent material to the first surface of the film.

The deposited image may be a composite produced may a combination of different processes. For example characters or letters may be applied by pressure transfer, such as may the Letraset technique, or alternatively a black xerographic image may be produced on a transparent film and a metallic coating applied thereto using a heat transfer foil and passing the foil and film through a heated roller. This transfers the metallic material from the foil to the black areas of the xerographic image. This film can then be laminated, together with a film carrying a colour image, between protective surface and backing sheets, so that when viewed the metallic image, characters or letters stand out in front of the colour image (which may for example be a picture).

Using the laminates and the process of the present invention, a wide variety of display systems, decorative and artistic pictures and designs can be quickly and economically manufactured in large or small numbers.

Compositions can be made using a computer screen, and transmitted to a xerographic colour copier using the appropriate software to produce the desired image. Indeed this is a particularly important application of the present invention, enabling the printing of photo-realistic enlarged images from digital cameras using a laser printer, or indeed any image output from a computer, including images scanned into or generated by a computer, and whether enhanced, or otherwise modified, by the computer, or not, the result being a dimensional photo-realistic durable print.

The invention can also be used to produce signs adapted to adhere to, and be viewed through, glass such as shop windows and the like. For example the optically transparent material comprising the protective cover surface for the image may itself have a surface which can adhere to a glass surface when pressed thereon. Alternatively, the protective cover surface in the laminate can comprise a release layer which can be removed to reveal the adhesive layer below. This can then be applied to the glass surface so that the glass surface becomes the protective cover surface for the laminate.

The invention is further described with reference to the accompanying drawing, in which the sole FIGURE is a schematic illustration of a laminating machine to be employed in the method of the present invention.

In the FIGURE, a laminator 10 has two facing rollers 12,14 of adjustable separation, the maximum separation being about 8 mm. Each roller comprises a mild steel core of diameter about 46 mm provided with a silicone rubber coat of external diameter about 55 mm (ie the rubber layer is about 4.5 mm thick). One of the rollers, preferably the roller 14, has a 10 mm bore to accept a cartridge heater (not shown) to raise the temperature of the surface of the roller 14 to about 82° C. The rubber coat has a hardness of about 65 Shore. A pressure arrangement (not shown) exerts an adjustable pressure between the rollers 12,14 (at least when a sheet to be laminated is passed between them) of between 750 and 830 KN per square meter.

A laminate roll 16 is disposed above a lamination table 18. The table 18 is in two parts 18a,b disposed one on either side of the roller pair 12,14, with their top surfaces 20a,b substantially at the same level as the gap between the two rollers 12,14. The laminate roll 16 has a roll of protective plastics sheet 22, having an adhesive applied thereto and backed by a release sheet 24. The sheet 22 is fed over the roller 14 so that it receives a degree of pre-heating before winding round a backing stripper roll 26. At the stripper roll 24, the backing layer 24 of the sheet 22 is separated from the sheet 22 and is wound around a backing sheet wind-up roll 28.

A polyester sheet (not shown) having a xerographic image deposited thereon is placed with the image face up on a smooth rigid board on the lamination table 18b on its top surface 20b. The sheet is fed into the mouth of the rollers 12,14 which are then rotated at a surface speed of about 6 to 9 mm per second. As the sheet is drawn in, so also is the adhesive backed protective sheet 22. Under the pressures and temperatures involved the adhesive is activated. More importantly, the pressure causes the protective sheet 22 to conform to the surface relief pattern of the toner deposit so that the relief is repeated in the surface of the protective sheet 22. This gives the final imaged article depth and dimension resulting in a very realistic feeling or impression not normally associated with xerographically or electrographically deposited images.

Once the imaged sheet has passed through the rollers, they are stopped and the excess protective sheet 22 is trimmed off leaving a tongue 22a thereof protruding through for the next sheet.

The invention is also illustrated by the following Examples:

EXAMPLE 1

This Example describes the production of a laminate according to the invention.

An opaque sheet of coated biaxially oriented polyethylene terephthalate Melinex film having good toner acceptance is placed in a Canon colour photocopier and an image xerographically deposited thereon. The film is then washed in a warm aqueous solution of detergent. The film is dried with a soft lint-free cloth.

A roll of clear acrylic plastic is provided with a layer of Mactac UV F2010 acrylic adhesive and placed in the laminate roll 16 of the laminator 10.

The laminate is then passed through the pair 12,14 of laminating rollers, spaced so as to apply pressure between 750 and 830 KN per square meter to the laminate. Surplus film after passage through the rollers 12,14 is trimmed with a sharp knife.

EXAMPLE 2

The process of example 1 is repeated except that the image is xerographically deposited on clear transparent coated polyester film. When the laminate has been produced the protective overlay is removed from the backing adhesive and the laminate is applied to a reflective material having a foil backing, thereby producing a reflective sign.

EXAMPLE 3

The process of example 1 is repeated except that there is interposed between the polyester sheet carrying the image and the transparent protective surface layer a further transparent coated film layer. The further layer is passed through a black and white photocopier to deposit a black image thereon and is then passed through a pair of heated rollers together with a metallic heat transfer material, to transfer the metallic material to the black portions of the image. The transparent film carrying the metallic image is then sandwiched between the transparent protective surface and the film carrying the xerographic colour image and laminated with further layers of optically clear adhesive. In this way metallic lettering or other characters can be viewed together with the colour image to achieve special effects.

EXAMPLE 4

The process of Example 1 is repeated except that the image is again produced on a clear transparent coated plastic film. When used with a reflective backing such as Maclite 1010, Cibalite or 3M Reflective, this can produce a sign having all reflective colours except black.

EXAMPLE 5

The process of Example 2 is repeated except that the reflective material is replaced with a translucent backing material. The resultant laminate can be illuminated from behind (backlit) to produce an illuminated sign or display.

EXAMPLE 6

The process of Example 1 is repeated except that the washing step is omitted and the adhesion-inhibiting silicone materials are removed from the image by wiping with a damp cloth to which a few drops of Fairy Liquid detergent have been applied. The film is then dried and treated as before to form a laminate.

I claim:

1. A laminate comprising:
   a first layer of thickness between 75 μm and 150 μm of a polyester material not being absorbent of xerographic toner and having an image deposited on a first surface thereof by an electrostatic deposition process,
   a second layer of optically transparent or translucent plastics material,
   a first surface of the first layer being bonded to the second layer by a layer of optically transparent adhesive material so that the relief of the deposited image is apparent in the laminate through the second layer,
   the arrangement being such that the image on the first layer can be viewed through the second layer and the layer of optically transparent adhesive material.

2. A laminate according to claim 1, in which the first layer of polyester material is coated to improve its image adhesion characteristics with a toner receptive layer and a conductive layer.

3. A laminate according to claim 2, in which the toner receptive layer comprises inorganic pigment in a mixture of cross-linked acrylic resins, adhesion promoters and resin modifiers.

4. A laminate according to claim 2, in which the conductive layer comprises polymeric antistatic resins and adhesion promoters, to give a resistivity of the surface of between 1 and 10 Giga Ohms per square.

5. A laminate according to claim 2, in which the coating has a thickness of about 15 μm, and is provided on both sides of the polyester sheet which has a thickness of about 100 μm.

6. A laminate according to claim 1, in which the second layer of optically transparent or translucent material comprises a polyester, an acrylic polymer, a polyethylene terephthalate, or a polycarbonate.

7. A laminate according to claim 1, in which the optically transparent adhesive material comprises an acrylic-based resin adhesive, an ethylene-propylene copolymer, a propylene polymer, or an ionomer resin-based adhesive.

8. A laminate according to claim 1, in which the adhesive is heat activated.

9. A laminate according to claim 1, that is provided with a backing sheet adhered thereto.

10. A laminate according to claim 9, wherein the backing sheet comprises a metal, cardboard, plastic or woodblock layer.

11. A laminate according to claim 1, wherein the first layer is capable of passage through an electrostatic printing process without additional support.

12. A laminate according to claim 1, in which the deposited image is a composite comprising an image produced by electrostatic deposition and an image produced by a different process.

13. A laminate according to claim 12, in which the different process is pressure transfer or heat transfer.

14. A laminate according to claim 1, in which the second layer of optically transparent or translucent material has a surface which can adhere to glass.

15. A method of making a laminate which comprises:
    depositing an image on a first surface of a first layer of thickness between 75 μm and 150 μm of a polyester material not being absorbent of xerographic toner by an electrostatic deposition process, and
    bonding a second layer of optically transparent or translucent material to the first surface of the first layer using an optically transparent adhesive material in a lamination process involving heat and pressure to ensure that the relief of the deposited image is apparent in the laminate through the second layer and such that the image on the first layer can be viewed through the second layer and the optically transparent adhesive material.

16. A method according to claim 15, wherein the lamination is conducted under a pressure of about 800 KN per square meter.

17. A method according to claim 15, wherein the lamination is conducted at a temperature of about 80° C.

18. A method according to claim 15, wherein lamination is conducted between lamination rollers at least one of which is heated to 80° C.

19. A method according to claim 15, wherein lamination is conducted between lamination rollers at least one of which has a coating of resilient material.

20. A method according to claim 19, wherein the coating is silicone rubber of hardness about 65 Shore and of a thickness of about 4.5 mm on a diameter of about 55 mm.

21. A method according to claim 15, which comprises removing adhesion inhibiting materials associated with the electrostatic deposition process from the polyester film material surface whilst leaving the image undisturbed, prior to bonding.

22. A method according to claim 21, which comprises washing or wiping the film with a cleaning liquid or solution.

23. A method according to claim 15, in which the optically transparent adhesive material is in the form of an adhesive film, optionally with a protective overlay on one or both surfaces.

24. A method according to claim 23, in which the adhesive film is a curing acrylic film.

25. A method according to claim 15, in which the image is deposited in a composite process comprising electrostatic deposition and a further process.

26. A method according to claim 25, in which the further process is pressure transfer or heat transfer.

27. A method of making a laminate which comprises:
    depositing an image on a first surface of a first layer of thickness between 75 μm and 150 μm of a polyester material not being absorbent of xerographic toner by an electrostatic deposition process,
    removing adhesion inhibiting materials associated with the electrostatographic deposition process from the polyester film material surface while leaving the image undisturbed by washing or wiping the film with a cleansing liquid or solution, and
    bonding a second layer of optically transparent or translucent material to the first surface of the first layer using an optically transparent adhesive material in a lamination process involving heat and pressure so that the second layer of material conforms to the surface relief of the deposited image to ensure that the relief of the deposited image is apparent in the laminate through the second layer such that the image on the first layer can be viewed through the second layer and the optically transparent adhesive material.

* * * * *